(12) United States Patent
Uosaki et al.

(10) Patent No.: US 7,605,208 B2
(45) Date of Patent: Oct. 20, 2009

(54) PROCESS FOR PRODUCING THERMOPLASTIC RESIN COMPOSITION

(75) Inventors: Hirotaka Uosaki, Ichihara (JP); Kuniaki Kawabe, Ichihara (JP); Motoyasu Yasui, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 304 days.

(21) Appl. No.: 11/589,853

(22) Filed: Oct. 31, 2006

(65) Prior Publication Data

US 2007/0100055 A1 May 3, 2007

Related U.S. Application Data

(60) Provisional application No. 60/738,585, filed on Nov. 22, 2005.

(30) Foreign Application Priority Data

Oct. 31, 2005 (JP) ............... 2005-316657

(51) Int. Cl.
C08J 3/22 (2006.01)
(52) U.S. Cl. .................... 524/487
(58) Field of Classification Search .......... 524/487
See application file for complete search history.

(56) References Cited

U.S. PATENT DOCUMENTS

| | | | |
|---|---|---|---|
| 4,960,878 A | 10/1990 | Crapo et al. | |
| 4,990,640 A | 2/1991 | Tsutsui et al. | |
| 5,041,584 A | 8/1991 | Crapo et al. | |
| 5,155,080 A | 10/1992 | Elder et al. | |
| 5,225,500 A | 7/1993 | Elder et al. | |
| 5,243,001 A | 9/1993 | Winter et al. | |
| 5,321,106 A | 6/1994 | LaPointe | |
| 5,387,568 A | 2/1995 | Ewen et al. | |
| 5,519,100 A | 5/1996 | Ewen et al. | |
| 5,561,092 A | 10/1996 | Ewen et al. | |
| 5,614,457 A | 3/1997 | Ewen et al. | |
| 5,663,249 A | 9/1997 | Ewen et al. | |
| 5,763,549 A | 6/1998 | Elder et al. | |
| 5,807,939 A | 9/1998 | Elder et al. | |
| 5,883,202 A | 3/1999 | Ewen et al. | |
| 6,303,071 B1 | 10/2001 | Sugawara et al. | |
| 6,939,928 B1 | 9/2005 | Kawai et al. | |
| 2003/0114322 A1 | 6/2003 | Richter et al. | |
| 2005/0228155 A1 | 10/2005 | Kawai et al. | |
| 2006/0161013 A1 | 7/2006 | Tohi et al. | |
| 2006/0189775 A1 | 8/2006 | Takahashi et al. | |

FOREIGN PATENT DOCUMENTS

| | | |
|---|---|---|
| JP | 63-502036 A | 8/1988 |
| JP | 1-501950 A | 7/1989 |
| JP | 1-502036 A | 7/1989 |
| JP | 2-024701 A | 1/1990 |
| JP | 2-24701 A | 1/1990 |
| JP | 2-78687 A | 3/1990 |
| JP | 2-078687 A | 3/1990 |
| JP | 2-167305 A | 6/1990 |
| JP | 3-103407 A | 1/1991 |
| JP | 3-103407 A | 4/1991 |
| JP | 03-103407 A | 4/1991 |
| JP | 3-179005 A | 8/1991 |
| JP | 3-179006 A | 8/1991 |
| JP | 3-207703 A | 9/1991 |
| JP | 3-207704 | 9/1991 |
| JP | 3-207704 A | 9/1991 |
| JP | 4-268307 A | 9/1992 |
| JP | 5-80492 B2 | 11/1993 |
| JP | 11-254512 A | 9/1999 |
| JP | 2003-183447 A | 7/2003 |
| JP | 2003-525329 A | 8/2003 |
| JP | 2003-528948 A | 9/2003 |
| JP | 2003335869 A * | 11/2003 |
| JP | 2004-51676 A | 2/2004 |
| JP | 2004-051676 A | 2/2004 |
| JP | 2004-175707 A | 6/2004 |
| JP | 2005-281449 A | 10/2005 |
| WO | WO 87/03003 | 5/1987 |
| WO | WO 88/05792 | 8/1988 |
| WO | WO 88/05792 A1 | 8/1988 |
| WO | WO 88/05793 A1 | 8/1988 |

(Continued)

OTHER PUBLICATIONS

Translation of JP 2003335869, Nov. 2003.*

Primary Examiner—Ling-Siu Choi
Assistant Examiner—Hui Chin
(74) Attorney, Agent, or Firm—Buchanan Ingersoll & Rooney PC

(57) ABSTRACT

The present invention provides a process for producing a thermoplastic resin composition comprising a polyolefin wax having good dispersibility for a thermoplastic resin, a molded product, which is excellent in physical properties such as blocking property and mechanical properties, from the thermoplastic resin composition and a process for producing the molded product.

Specifically, a process for producing a thermoplastic resin composition comprises melt-kneading a mixture of a polyolefin wax (A) which has a passing ratio through a mesh having a sieve opening of 5.66 mm$\phi$ of 95% by weight or more, and a non-passing ratio through a mesh having a sieve opening of 2.00 mm$\phi$ of 95% by weight or more, and is in the particle form, and a thermoplastic resin (B), a molded product, which is excellent in physical properties such as blocking property and mechanical properties, obtained from the thermoplastic resin composition and a process for producing the molded product are provided.

7 Claims, No Drawings

FOREIGN PATENT DOCUMENTS

| | | |
|---|---|---|
| WO | WO 97/45246 A1 | 12/1997 |
| WO | WO 01/27124 A1 | 4/2001 |
| WO | WO 2004/029062 A1 | 4/2004 |
| WO | WO 2004/083265 A1 | 9/2004 |
| WO | WO 2004/083265 A1 | 8/2006 |

* cited by examiner

PROCESS FOR PRODUCING THERMOPLASTIC RESIN COMPOSITION

BACKGROUND OF THE INVENTION

1. Field of the Invention

The present invention relates to a process for producing a thermoplastic resin composition, and more specifically to a process for producing a thermoplastic resin composition using a polyolefin wax in a specific form and a thermoplastic resin, a process for producing a molded product from the thermoplastic resin composition, and a molded product obtained from the thermoplastic resin composition.

2. Description of the Related Art

Conventionally, a polyolefin wax has been used in a thermoplastic resin composition for a lubricant, a releasing agent, a molding aid, or the like (for example, Patent Documents 1 and 2).

The polyolefin wax, which is usually in a powdered form, is mixed with a thermoplastic resin, and thus obtained mixture is molded into a thermoplastic resin composition using an extrusion molding machine. However, the production by these methods leads to the compositional variation in the mixture and the dissolution of the polyolefin wax prior to the dissolution of the thermoplastic resin in a molding machine such as an extrusion molding machine, so the dispersion of the polyolefin wax for the thermoplastic resin was insufficient, the expected performance caused by the addition of a wax such as improvement of releasability against the increase of the added amount of the wax is not provided, and the performances of the obtained thermoplastic resin compositions are varied.

[Patent Document 1] JP-B No. 5-80492

[Patent Document 2] JP-A No. 2003-528948

It is an object of the present invention to provide a process for producing a thermoplastic resin composition comprising a polyolefin wax having good dispersibility for a thermoplastic resin, a process for producing a molded product using the thermoplastic resin composition, and a molded product obtained from the thermoplastic resin composition.

SUMMARY OF THE INVENTION

The present inventors have reviewed the above-described problems, and as a result, they have found that a thermoplastic resin composition having good dispersibility of a polyolefin wax into a thermoplastic resin is obtained by melting and molding a mixture of a polyolefin wax in a specific form and a thermoplastic resin, and a molded product having excellent physical properties can be obtained by using the composition, thus leading to completion of the present invention.

Specifically, the process for producing a thermoplastic resin composition of the present invention is characterized in that a mixture of a polyolefin wax (A) in the particle form, which has a passing ratio through a mesh having a sieve opening of 5.66 mmφ of 95% by weight or more, and a non-passing ratio through a mesh having a sieve opening of 2.00 mmφ of 95% by weight or more, and a thermoplastic resin (B) is melt-kneaded.

The polyolefin wax (A) is preferably a polyethylene wax, and more preferably a metallocene polyethylene wax.

A molded product of the present invention is obtained by molding thus obtained thermoplastic resin composition.

According to the present invention, a thermoplastic resin composition having good dispersibility of a polyolefin wax into a thermoplastic resin is obtained, and a molded product obtained from the thermoplastic resin composition is excellent in physical properties, such as blocking property, mechanical properties, and the like.

BEST MODE FOR CARRYING OUT THE INVENTION

Hereinbelow, the present invention will be described in detail.

[Polyolefin Wax (A)]

The polyolefin wax (A) in the present invention is a polyolefin wax having a crystallization temperature, as measured by a differential scanning calorimeter (DSC) at a temperature lowering rate of 2° C./min., in the range of 65 to 120° C., and a number-average molecular weight (Mn) in terms of polystyrene, as measured by gel permeation chromatography (GPC), in the range of 400 to 5,000. The number-average molecular weight (Mn) of 400 to 5,000 in terms of polystyrene is synonymous with the number-average molecular weight (Mn) of 200 to 2,500 in terms of polyethylene.

The number-average molecular weight (Mn) in terms of polyethylene is determined by converting the number-average molecular weight (Mn) in terms of polystyrene according to the calibration method using the coefficient of Mark-Houwink viscosity equation.

The coefficients of the Mark-Houwink viscosity equation are shown as below.

The coefficient of polystyrene: $KPS=1.38\times10-4$, $aPS=0.70$

The coefficient of polyethylene: $KPE=5.06\times10-4$, $aPE=0.70$

The polyolefin wax (A) of the present invention has a feature of having a specific form. The polyolefin wax (A) of the present invention is a particle in the form of a pellet or a tablet, which has a passing ratio through a mesh having a sieve opening of 5.66 mmφ of 95% by weight or more, and a non-passing ratio through a mesh having a sieve opening of 2.00 mmφ of 95% by weight or more.

By using such the polyolefin wax (A) in the particle form, the polyolefin wax A has excellent dispersibility for a thermoplastic resin (B) as described below upon mixing them. Further, since, upon melt-kneading a mixture thereof, the polyolefin wax (A) has excellent dispersibility for a thermoplastic resin (B), thus obtained thermoplastic resin composition is excellent in physical properties, such as blocking property, mechanical properties, and the like.

For the ratio of the amount of the polyolefin wax (A) which passes through a mesh (hereinafter, which may be referred to as a "mesh passing amount"), it is preferable that the passing amount ratio through a mesh having a sieve opening of 5.66 mmφ is 95% by weight or more, the passing amount ratio through a mesh having a sieve opening of 4.75 mmφ is 70% by weight or more, and the passing amount ratio through a mesh having a sieve opening of 4.00 mmφ is 40% by weight or more, and it is more preferable that the passing amount ratio through a mesh having a sieve opening of 5.66 mmφ is 99% by weight or more, the passing amount ratio through a mesh having a sieve opening of 4.75 mmφ is 75% by weight or more, and the passing amount ratio through a mesh having a sieve opening of 4.00 mmφ is 45% by weight or more.

For the ratio of the amount of the polyolefin wax (A) which does not pass through a mesh (hereinafter, which may be referred to as a "mesh-on amount"), it is preferable that the non-passing amount ratio through a mesh having a sieve opening of 2.00 mmφ is 95% by weight or more, the non-passing amount ratio through a mesh having a sieve opening of 2.83 mmφ is 80% by weight or more, and the non-passing amount ratio through a mesh having a sieve opening of 3.35 mmφ is 50% by weight or more, and for the ratio of the amount of the polyolefin wax (A) which does not pass through a mesh, it is more preferable that that the non-passing ratio through a mesh having a sieve opening of 2.00 mmφ is 99% by weight or more, the non-passing ratio through a mesh having a sieve opening of 2.83 mmφ is 85% by weight or more, and the non-passing ratio through a mesh having a sieve opening of 3.35 mmφ is 60% by weight or more.

With the mesh passing amount and the mesh-on amount of the polyolefin wax in the above range, the polyolefin wax can be readily mixed with a thermoplastic resin (B) as described below, and that is, for example, if the thermoplastic resin (B) is in the form of a pellet, they can be easily mixed in a device such as a tumbler mixer without classification.

The polyolefin wax in such the form can be obtained, for example, by melting a polyolefin as a raw material at a melting point or higher, and dropping the melted wax onto a cooling steel belt of a tabletizer for solidifying the wax.

The temperature for melting the wax can be suitably selected according to the wax as long as it is no lower than the melting point of the wax, but usually it is preferably in the range of 100 to 160° C., and more preferably 130 to 150° C.

The temperature of the cooling steel belt can be suitably selected according to the wax as long as it is no higher than the melting point of the wax, but usually it is preferably in the range of 10 to 40° C., and more preferably 15 to 30° C.

The speed of the cooling steel belt can be suitably selected, but usually it is preferably in the range of 10 to 25 m/min, and more preferably 10 to 20 m/min.

The polyolefin wax (A) used in the present invention is not particularly limited as long as it is a wax of polyolefin, but examples thereof include a polyethylene wax, a polypropylene wax, a wax of an α-olefin homopolymer, a wax of an ethylene/α-olefin copolymer, and a wax of an ethylene/α-olefin/non-conjugated diene copolymer.

In the present invention, a polyethylene wax, a wax of an ethylene/α-olefin copolymer, and a wax of an ethylene/α-olefin/non-conjugated diene copolymer may be collectively referred to a polyethylene based wax.

Among these polyolefin waxes, a polyethylene wax, and a wax of an ethylene/α-olefin copolymer are preferable; a polyethylene wax, a wax of a copolymer of ethylene and an α-olefin having 3 to 20 carbon atoms is more preferable; a polyethylene wax, a wax of an ethylene/propylene copolymer, a wax of an ethylene/1-butene copolymer, a wax of an ethylene/1-pentene copolymer, a wax of an ethylene/1-hexene copolymer, a wax of an ethylene/4-methyl-1-pentene copolymer, and a wax of an ethylene/1-octene copolymer are even more preferable; a polyethylene wax, a wax of an ethylene/propylene copolymer, a wax of an ethylene/1-butene copolymer, a wax of an ethylene/1-hexene copolymer, and a wax of an ethylene/4-methyl-1-pentene copolymer are particularly preferable.

If the polyolefin wax (A) is the above-described polyolefin wax, the dispersity for the thermoplastic resin (B) to be described later, in particular, for a polyolefin resin as the thermoplastic resin (B), is essentially excellent.

The polyolefin wax (A) has a number-average molecular weight (Mn) in terms of polystyrene, as measured by gel permeation chromatography (GPC), in the range of usually 400 to 5,000, preferably 700 to 4,500, more preferably 800 to 4,000.

With the Mn of the polyolefin wax (A) in the above range, the effect of improvement on the fluidity upon preparation of the thermoplastic resin composition is increased, and a homogeneous thermoplastic resin composition can be easily obtained.

In the present invention, the polyolefin wax (A) may have a number-average molecular weight (Mn) in terms of polyethylene, in the range of more than 2,500 to 5,000.

Therefore, in another aspect of the invention, the polyolefin wax (A) has a number-average molecular weight (Mn) in terms of polyethylene, in the range of preferably 200 to 5,000, more preferably 400 to 5,000.

With the Mn of the polyolefin wax (A) in the above range, the effect of improvement on the fluidity upon preparation of the thermoplastic resin composition is increased, and a homogeneous thermoplastic resin composition can be easily obtained.

The polyolefin wax (A) has a ratio (Mw/Mn) of the weight-average molecular weight (Mw) to the number-average molecular weight (Mn) in terms of polystyrene, as measured by gel permeation chromatography (GPC), in the range of preferably 1.5 to 4.0, more preferably 1.5 to 3.5.

With the Mw/Mn of the polyolefin wax (A) in the above range, the surface tackiness of the molded product obtained from the thermoplastic resin composition can be essentially reduced.

The polyolefin wax (A) has a crystallization temperature, as measured by a differential scanning calorimeter (DSC) under the condition of a temperature lowering rate of 2° C./min., preferably in the range of 65 to 120° C., more preferably in the range of 70 to 120° C., and particularly preferably in the range of 70 to 118° C.

With the crystallization temperature of the polyolefin wax (A) in the above range, the surface tackiness of the molded product obtained from the thermoplastic resin composition can be essentially reduced.

The polyolefin wax (A) has a density, as measured by a density gradient tube method in accordance with JIS K7112, in the range of preferably 850 to 980 kg/m$^3$, more preferably 870 to 980 kg/m$^3$, and even more preferably 890 to 980 kg/m$^3$.

With the density of the polyolefin wax in the above range, the molding shrinkage of the molded product obtained from the thermoplastic resin composition can be easily regulated.

Further, the polyolefin wax (A) satisfies the following relationship represented preferably by the following formula (I), more preferably the following formula (Ia), and even more preferably the following formula (Ib), of the crystallization temperature [Tc (° C.)], as measured by a differential scanning calorimeter (DSC), and the density (D (kg/m$^3$)), as measured by a density gradient tube process:

$$0.501 \times D - 366 \geq Tc \quad (I)$$

$$0.501 \times D - 366.5 \geq Tc \quad (Ia)$$

$$0.501 \times D - 367 \geq Tc \quad (Ib)$$

If the crystallization temperature (Tc) and the density (D) of the polyolefin wax (A), which is an ethylene/α-olefin copolymer for example, satisfy the above formula the compositional distribution of the copolymer is more uniform, and as a result, the tackiness of the molded product obtained from the thermoplastic resin composition comprising the polyolefin wax (A) and the thermoplastic resin (B) as described below tends to be reduced.

The penetration hardness of the polyolefin wax (A), as measured in accordance with JIS K2207, is usually 30 dmm or less, preferably 25 dmm or less, more preferably 20 dmm or less, and even more preferably 15 dmm or less.

With the penetration hardness of the polyolefin wax (A) in the above range, a molded product obtained from the thermoplastic resin composition of the present invention can be provided with sufficient strength.

The polyolefin wax (A) has an acetone extraction quantity in the range of preferably 0 to 20% by weight, more preferably 0 to 15% by weight.

Further, the acetone extraction quantity is a value measured in the following manner.

In a Soxhlet's extractor (made of glass), a filter (ADVANCE, No. 84) is used, and 200 ml of acetone is introduced into a 300 ml round-bottom flask in the lower part. Extraction is carried out in a hot-water bath at 70° C. for 5 hours. 10 g of the first wax is set on the filter.

The polyolefin wax (A) is a solid at room temperature, and is a low-viscosity liquid at 65 to 130° C., or higher.

With the acetone extraction quantity of the polyolefin wax (A) in the above range, the content of the tacky components is decreased, and the fouling of the mold is suppressed, as well as a molded product with no surface tackiness can be obtained.

The process for producing the polyolefin wax is not particularly limited, but the polyolefin wax can be obtained, for example, by the polymerization of monomers such as ethylene and an α-olefin, using a Ziegler/Natta catalyst or a metallocene catalyst. Among these catalysts, a metallocene catalyst is preferable.

Examples of the metallocene catalyst include a catalyst for olefin polymerization comprising:

(A) a metallocene compound of a transition metal selected from Group 4 of the periodic table, and (B) at least one kind of the compound selected from (b-1) an organoaluminum oxy-compound, (b-2) a compound which reacts with the bridged metallocene compound (A) to form ion pairs, and (b-3) an organoaluminum compound.

Hereinbelow, each of the components will be described in detail.

[Metallocene Compound]

(A) Metallocene Compound of Transition Metal Selected from Group 4 of the Periodic Table The metallocene compound for forming the metallocene catalyst is a metallocene compound of a transition metal selected from Group 4 of the periodic table, and a specific example thereof is a compound represented by the following formula (1):

$$M^1 L_x \quad (1)$$

In the above formula, $M^1$ is a transition metal selected from Group 4 of the periodic table, x is a valence of the transition metal $M^1$, and L is a ligand. Examples of the transition metals indicated by $M^1$ include zirconium, titanium and hafnium. L is a ligand coordinated to the transition metal $M^1$, and at least one ligand L is a ligand having a cyclopentadienyl skeleton. This ligand having cyclopentadienyl skeleton may have a substituent. Examples of the ligands L having the cyclopentadienyl skeleton include alkyl or cycloalkyl substituted cyclopentadienyl groups, such as a cyclopentadienyl group, a methylcyclopentadienyl group, an ethylcyclopentadienyl, an n- or i-propylcyclopentadienyl group, an n-, i-, sec-, or t-butylcyclopentadienyl group, a dimethylcyclopentadienyl group, a methylpropylcyclopentadienyl group, a methylbutylcyclopentadienyl group, and a methylbenzylcyclopentadienyl group; and further an indenyl group, a 4,5,6,7-tetrahydroindenyl group and a fluorenyl group. In these ligands having cyclopentadienyl skeleton, hydrogen may be replaced with a halogen atom, a trialkylsilyl group or the like.

When the metallocene compound has two or more ligands having cyclopentadienyl skeleton as ligands L, two of the ligands having cyclopentadienyl skeleton may be bonded to each other through an alkylene group, such as ethylene or propylene, a substituted alkylene group, such as isopropylidene or diphenylmethylene, a silylene group, or a substituted silylene group, such as dimethylsilylene, diphenylsilylene or methylphenylsilylene.

The ligand L other than the ligand having cyclopentadienyl skeleton (ligand having no cyclopentadienyl skeleton) is, for example, a hydrocarbon group of 1 to 12 carbon atoms, an alkoxy group, an aryloxy group, a sulfonic acid-containing group ($-SO_3R^1$), wherein $R^1$ is an alkyl group, an alkyl group substituted with a halogen atom, an aryl group, an aryl group substituted with a halogen atom, or an aryl group substituted with an alkyl group, a halogen atom or a hydrogen atom.

EXAMPLE 1 OF METALLOCENE COMPOUND

When the metallocene compound represented by the above formula (1) has a transition metal valence of, for example, 4, this metallocene compound is more specifically represented by the following formula (2):

$$R^2_k R^3_l R^4_m R^5_n M^1 \quad (2)$$

wherein $M^1$ is a transition metal selected from Group 4 of the periodic table, $R^2$ is a group (ligand) having cyclopentadienyl skeleton, and $R^3$, $R^4$ and $R^5$ are each independently a group (ligand) having or not having cyclopentadienyl skeleton, k is an integer of 1 or greater, and k+l+m+n=4.

Examples of the metallocene compounds having zirconium as $M^1$ and having at least two ligands having cyclopentadienyl skeleton include bis(cyclopentadienyl)zirconium monochloride monohydride, bis(cyclopentadienyl)zirconium dichloride, bis(1-methyl-3-butylcyclopentadienyl)zirconium-bis(trifluoromethanesulfonate) and bis(1,3-dimethylcyclopentadienyl)zirconium dichloride.

Also employable are compounds wherein the 1,3-position substituted cyclopentadienyl group in the above compounds is replaced with a 1,2-position substituted cyclopentadienyl group.

As another example of the metallocene compound, a metallocene compound of bridge type wherein at least two of $R^2$, $R^3$, $R^4$ and $R^5$ in the formula (2), e.g., $R^2$ and $R^3$, are groups (ligands) having cyclopentadienyl skeleton and these at least two groups are bonded to each other through an alkylene group, a substituted alkylene group, a silylene group, a substituted silylene group or the like is also employable. In this case, $R^4$ and $R^5$ are each independently the same as the ligand L other than the aforesaid ligand having cyclopentadienyl skeleton.

Examples of the metallocene compounds of bridge type include ethylenebis(indenyl)dimethylzirconium, ethylenebis(indenyl)zirconium dichloride, isopropylidene(cyclopentadienyl-fluorenyl)zirconium dichloride, diphenylsilylenebis(indenyl)zirconium dichloride and methylphenylsilylenebis(indenyl)zirconium dichloride.

EXAMPLE 2 OF METALLOCENE COMPOUND

Another example of the metallocene compound is a metallocene compound represented by the following formula (3) that is described in JP-A No. Hei 4-268307.

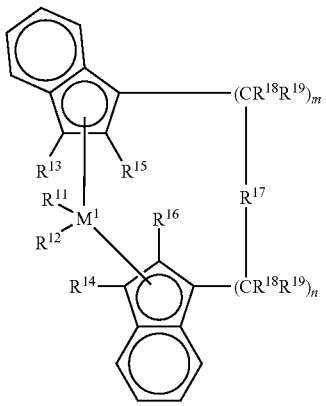

(3)

In the above formula, $M^1$ is a transition metal of Group 4 of the periodic table, specifically titanium, zirconium or hafnium.

$R^{11}$ and $R^{12}$ may be the same as or different from each other and are each a hydrogen atom, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms, an arylalkenyl group of 8 to 40 carbon atoms or a halogen atom. $R^{11}$ and $R^{12}$ are each preferably a chlorine atom.

$R^{13}$ and $R^{14}$ may be the same as or different from each other and are each a hydrogen atom, a halogen atom, an alkyl group of 1 to 10 carbon atoms which may be halogenated, an aryl group of 6 to 10 carbon atoms, or a group of —N($R^{20}$)$_2$, —S$R^{20}$, —OSi($R^{20}$)$_3$, —Si($R^{20}$)$_3$ or —P($R^{20}$)$_2$. $R^{20}$ is a halogen atom, preferably a chlorine atom, an alkyl group of 1 to 10 carbon atoms (preferably 1 to 3 carbon atoms) or an aryl group of 6 to 10 carbon atoms (preferably 6 to 8 carbon atoms). $R^{13}$ and $R^{14}$ are each particularly preferably a hydrogen atom.

$R^{15}$ and $R^{16}$ are the same as $R^{13}$ and $R^{14}$, except that a hydrogen atom is not included, and they may be the same as or different from each other, preferably the same as each other. $R^{15}$ and $R^{16}$ are each preferably an alkyl group of 1 to 4 carbon atoms which may be halogenated, specifically methyl, ethyl, propyl, isopropyl, butyl, isobutyl, trifluoromethyl or the like, particularly preferably methyl.

In the formula (3), $R^{17}$ is selected from the following group:

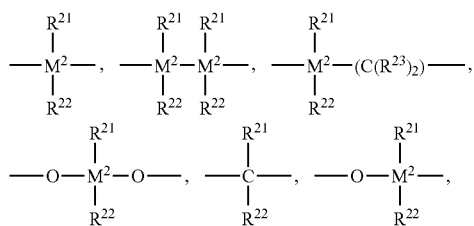

=$BR^{21}$, =$AlR^{21}$, —Ge—, —Sn—, —O—, —S—, =SO, =SO$_2$, =NR$^{21}$, =CO, =PR$^2$, =P(O)R$^2$, etc.

$M^2$ is silicon, germanium or tin, preferably silicon or germanium. $R^{21}$, $R^{22}$ and $R^{23}$ may be the same as or different from one another and are each a hydrogen atom, a halogen atom, an alkyl group of 1 to 10 carbon atoms, a fluoroalkyl group of 1 to 10 carbon atoms, an aryl group of 6 to 10 carbon atom, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms, or an alkylaryl group of 7 to 40 carbon atoms. "$R^{21}$ and $R^{22}$" or "$R^{21}$ and $R^{23}$", may form a ring together with atoms to which they are bonded. $R^{17}$ is preferably =$CR^{21}R^{22}$, =$SiR^{21}R^{22}$, =$GeR^{21}R^{22}$, —O—, —S—, =SO, =$PR^{21}$ or =$P(O)R^{21}$. $R^{18}$ and $R^{19}$ may be the same as or different from each other and are each the same atom or group as that of $R^{21}$. m and n may be the same as or different from each other and are each 0, 1 or 2, preferably 0 or 1, and m+n is 0, 1 or 2, preferably 0 or 1.

Examples of the metallocene compounds represented by the formula (3) include rac-ethylene(2-methyl-1-indenyl)$_2$-zirconium dichloride and rac-dimethylsilylene (2-methyl-1-indenyl)$_2$-zirconium dichloride. These metallocene compounds can be prepared by, for example, a process described in JP-A No. Hei 4-268307.

EXAMPLE 3 OF METALLOCENE COMPOUND

As the metallocene compound, a metallocene compound represented by the following formula (4) is also employable.

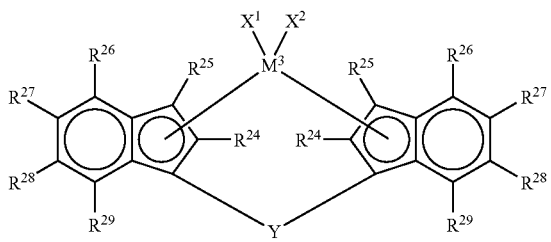

(4)

In the formula (4), $M^3$ is a transition metal atom of Group 4 of the periodic table, specifically titanium, zirconium or hafnium. $R^{24}$ and $R^{25}$ may be the same as or different from each other and are each a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group. $R^{24}$ is preferably a hydrocarbon group, particularly preferably an alkyl group of 1 to 3 carbon atoms, i.e., methyl, ethyl or propyl. $R^{25}$ is preferably a hydrogen atom or hydrocarbon group, particularly preferably a hydrogen atom or an alkyl group of 1 to 3 carbon atoms, i.e., methyl, ethyl or propyl. $R^{26}$, $R^{27}$, $R^{28}$ and $R^{29}$ may be the same as or different from one another and are each a hydrogen atom, a halogen atom, a hydrocarbon group of 1 to 20 carbon atoms or a halogenated hydrocarbon group of 1 to 20 carbon atoms. Of these, preferable is a hydrogen atom, a hydrocarbon group or a halogenated hydrocarbon group. At least one combination of "$R^{26}$ and $R^{27}$", "$R^{27}$ and $R^{28}$", and "$R^{28}$ and $R^{29}$" may form a monocyclic aromatic ring together with carbon atoms to which they are bonded. When there are two or more hydrocarbon groups or halogenated hydrocarbon groups other than the groups that form the aromatic ring, they may be bonded to each other to form a ring. When $R^{29}$ is a substituent other than the aromatic group, it is preferably a hydrogen atom. $X^1$ and $X^2$ may be the same as or different from each other and are each a hydrogen atom, a halogen atom, a hydrocarbon group of 1 to 20 carbon atoms, a halogenated hydrocarbon group of 1 to 20 carbon atoms, an oxygen-containing group or a sulfur-containing group. Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{30}$—, —P(R$^{30}$)—, —P(O)(R$^{30}$)—, —BR$^{30}$— or —AlR$^{30}$— (R$^{30}$ is a hydrogen atom, a halogen atom, a hydrocarbon group of 1 to 20 carbon atoms or a halogenated hydrocarbon group of 1 to 20 carbon atoms).

In the formula (4), examples of the ligands which have a monocyclic aromatic ring formed by mutual bonding of at least one combination of R$^{26}$ and R$^{27}$, R$^{27}$ and R$^{28}$, and R$^{28}$ and R$^{29}$ and which are coordinated to M$^3$ include those represented by the following formulas:

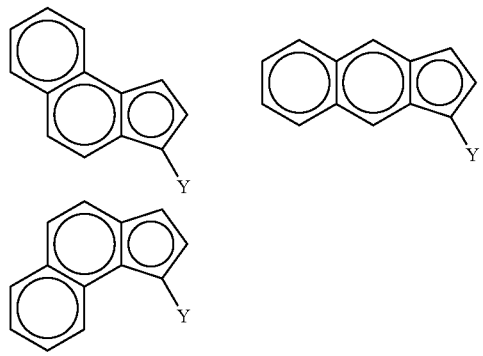

(wherein Y is the same as that described in the above-mentioned formula).

EXAMPLE 4 OF METALLOCENE COMPOUND

As the metallocene compound, a metallocene compound represented by the following formula (5) is also employable.

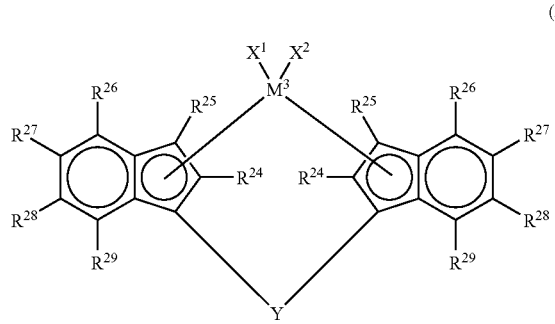

(5)

In the formula (5), M$^3$, R$^{24}$, R$^{25}$, R$^{26}$, R$^{27}$, R$^{28}$ and R$^{29}$ are the same as those in the formula (4). Of R$^{26}$, R$^{27}$, R$^{28}$ and R$^{29}$, two groups including R$^{26}$ are each preferably an alkyl group, and R$^{26}$ and R$^{28}$, or R$^{28}$ and R$^{29}$ are each preferably an alkyl group. This alkyl group is preferably a secondary or tertiary alkyl group. Further, this alkyl group may be substituted with a halogen atom or a silicon-containing group. Examples of the halogen atoms and the silicon-containing groups include substituents exemplified with respect to R$^{24}$ and R$^{25}$. Of R$^{26}$, R$^{27}$, R$^{28}$ and R$^{29}$, groups other than the alkyl group are each preferably a hydrogen atom. Two groups selected from R$^{26}$, R$^{27}$, R$^{28}$ and R$^{29}$ may be bonded to each other to form a monocycle or a polycycle other than the aromatic ring. Examples of the halogen atoms include the same atoms as described with respect to R$^{24}$ and R$^{25}$. Examples of X$^1$, X$^2$ and Y include the same atoms and groups as previously described.

Examples of the metallocene compounds represented by the formula (5) include:
rac-dimethylsilylene-bis(4,7-dimethyl-1-indenyl)zirconium dichloride, rac-dimethylsilylene-bis(2,4,7-trimethyl-1-indenyl)zirconium dichloride and rac-dimethylsilylene-bis (2,4,6-trimethyl-1-indenyl)zirconium dichloride.

Also employable are transition metal compounds wherein the zirconium metal is replaced with a titanium metal or a hafnium metal in the above compounds. The transition metal compound is usually used as a racemic modification, but R form or S form is also employable.

EXAMPLE 5 OF METALLOCENE COMPOUND

As the metallocene compound, a metallocene compound represented by the following formula (6) is also employable.

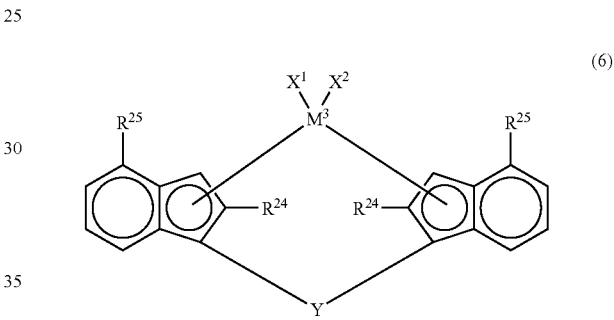

(6)

In the formula (6), M$^3$, R$^{24}$, X$^1$, X$^2$ and Y are the same as those in the formula (4). R$^{24}$ is preferably a hydrocarbon group, particularly preferably an alkyl group of 1 to 4 carbon atoms, i.e., methyl, ethyl, propyl or butyl. R$^{25}$ is an aryl group of 6 to 16 carbon atoms. R$^{25}$ is preferably phenyl or naphthyl. The aryl group may be substituted with a halogen atom, a hydrocarbon group of 1 to 20 carbon atoms or a halogenated hydrocarbon group of 1 to 20 carbon atom. X$^1$ and X$^2$ are each preferably a halogen atom or a hydrocarbon group of 1 to 20 carbon atoms.

Examples of the metallocene compounds represented by the formula (6) include:
rac-dimethylsilylene-bis(4-phenyl-1-indenyl)zirconium dichloride, rac-dimethylsilylene-bis(2-methyl-4-phenyl-1-indenyl)zirconium dichloride, rac-dimethylsilylene-bis(2-methyl-4-α-naphthyl)-1-indenyl)zirconium dichloride, rac-dimethylsilylene-bis(2-methyl-4-(β-naphthyl)-1-indenyl)zirconium dichloride and rac-dimethylsilylene-bis(2-methyl-4-(1-anthryl)-1-indenyl)zirconium dichloride. Also employable are transition metal compounds wherein the zirconium metal is replaced with a titanium metal or a hafnium metal in the above compounds.

EXAMPLE 6 OF METALLOCENE COMPOUND

As the metallocene compound, a metallocene compound represented by the following formula (7) is also employable.

$$LaM^4X^3{}_2 \qquad (7)$$

In the above formula, $M^4$ is a metal of Group 4 or lanthanide series of the periodic table. La is a derivative of a delocalized π bond group and is a group imparting a constraint geometric shape to the metal $M^4$ active site. Each $X^3$ may be the same or different and is a hydrogen atom, a halogen atom, a hydrocarbon group of 20 or less carbon atoms, a silyl group having 20 or less silicon atoms or a germyl group having 20 or less germanium atoms.

Of such compounds, a compound represented by the following formula (8) is preferable.

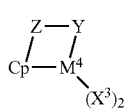

(8)

In the formula (8), $M^4$ is titanium, zirconium or hafnium. $X^3$ is the same as that described in the formula (7). Cp is π-bonded to $M^4$ and is a substituted cyclopentadienyl group having a substituent Z. Z is oxygen, sulfur, boron or an element of Group 4 of the periodic table (e.g., silicon, germanium or tin). Y is a ligand having nitrogen, phosphorus, oxygen or sulfur, and Z and Y may together form a condensed ring. Examples of the metallocene compounds represented by the formula (8) include:

(dimethyl(t-butylamide)(tetramethyl-$\eta^5$-cyclopentadienyl)silane)titanium dichloride and ((t-butylamide)(tetramethyl-$\eta^5$-cyclopentadienyl)-1,2-ethanediyl)titanium dichloride. Also employable are metallocene compounds wherein titanium is replaced with zirconium or hafnium in the above compounds.

EXAMPLE 7 OF METALLOCENE COMPOUND

As the metallocene compound, a metallocene compound represented by the following formula (9) is also employable.

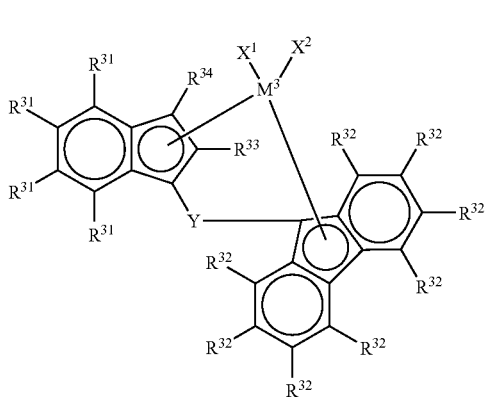

(9)

In the formula (9), $M^3$ is a transition metal atom of Group 4 of the periodic table, specifically titanium, zirconium or hafnium, preferably zirconium. Each $R^{31}$ may be the same or different, and at least one of them is an aryl group of 11 to 20 carbon atoms, an arylalkyl group of 12 to 40 carbon atoms, an arylalkenyl group of 13 to 40 carbon atoms, an alkylaryl group of 12 to 40 carbon atoms or a silicon-containing group, or at least two neighboring groups of the groups indicated by $R^{31}$ form single or plural aromatic rings or aliphatic rings together with carbon atoms to which they are bonded. In this case, the ring formed by $R^{31}$ has 4 to 20 carbon atoms in all including carbon atoms to which $R^{31}$ is bonded. $R^{31}$ other than $R^{31}$ that is an aryl group, an arylalkyl group, an arylalkenyl group or an alkylaryl group or that forms an aromatic ring or an aliphatic ring is a hydrogen atom, a halogen atom, an alkyl group of 1 to 10 carbon atoms or a silicon-containing group. Each $R^{32}$ may be the same or different and is a hydrogen atom, a halogen atom, an alkyl group of 1 to 10 carbon atoms, an aryl group of 6 to 20 carbon atoms, an alkenyl group of 2 to 10 carbon atoms, an arylalkyl group of 7 to 40 carbon atoms, an arylalkenyl group of 8 to 40 carbon atoms, an alkylaryl group of 7 to 40 carbon atoms, a silicon-containing group, an oxygen-containing group, a sulfur-containing group, a nitrogen-containing group or a phosphorus-containing group. At least two neighboring groups of the groups indicated by $R^{32}$ may form single or plural aromatic rings or aliphatic rings together with carbon atoms to which they are bonded. In this case, the ring formed by $R^{32}$ has 4 to 20 carbon atoms in all including carbon atoms to which $R^{32}$ is bonded. $R^{32}$ other than $R^{32}$ that forms an aromatic ring or an aliphatic ring is a hydrogen atom, a halogen atom, an alkyl group of 1 to 10 carbon atoms or a silicon-containing group. In the groups constituted of single or plural aromatic rings or aliphatic rings formed by two groups indicated by $R^{32}$, an embodiment wherein the fluorenyl group part has such a structure as represented by the following formula is included.

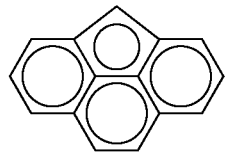

$R^{32}$ is preferably a hydrogen atom or an alkyl group, particularly preferably a hydrogen atom or a hydrocarbon group of 1 to 3 carbon atoms, i.e., methyl, ethyl or propyl. A preferred example of the fluorenyl group having $R^{32}$ as such a substituent is a 2,7-dialkyl-fluorenyl group, and in this case, an alkyl group of the 2,7-dialkyl is, for example, an alkyl group of 1 to 5 carbon atoms. $R^{31}$ and $R^{32}$ may be the same as or different from each other. $R^{33}$ and $R^{34}$ may be the same as or different from each other and are each a hydrogen atom, a halogen atom, an alkyl group of 1 to 10 carbon atoms, an aryl group of 6 to 20 carbon atoms, an alkenyl group of 2 to 10 carbon atoms, an arylalkyl group of 7 to 40 carbon atoms, and arylalkenyl group of 8 to 40 carbon atoms, an alkylaryl group of 7 to 40 carbon atoms, a silicon-containing group, an oxygen-containing group, a sulfur-containing group, a nitrogen-containing group or a phosphorus-containing group, similarly to the above. At least one of $R^{33}$ and $R^{34}$ is preferably an alkyl group of 1 to 3 carbon atoms. $X^1$ and $X^2$ may be the same as or different from each other and are each a hydrogen atom, a halogen atom, a hydrocarbon group of 1 to 20 carbon atoms, a halogenated hydrocarbon group of 1 to 20 carbon atoms, an oxygen-containing group, a sulfur-containing group or a nitrogen-containing group, or $X^1$ and $X^2$ form a conjugated diene residue. Preferred examples of the conjugated diene residues formed from $X^1$ and $X^2$ include residues of 1,3-butadiene, 2,4-hexadiene, 1-phenyl-1,3-pentadiene and 1,4-diphenylbutadiene, and these residues may be further substituted with a hydrocarbon group of 1 to 10 carbon atoms. $X^1$ and $X^2$ are each preferably a halogen atom, a hydrocarbon group of 1 to 20 carbon atoms or a sulfur-containing group. Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{35}$—, —P(R$^{35}$)—, —P(O)(R$^{35}$)—, —BR$^{35}$— or —AlR$^{35}$— (R$^{35}$ is a hydrogen atom, a halogen atom, a hydrocarbon group of 1 to 20 carbon atoms or a halogenated hydrocarbon group of 1 to 20 carbon atoms). Of these divalent groups, preferable are those wherein the shortest linkage part of —Y— is constituted of one or two atoms. R$^{35}$ is a halogen atom, a hydrocarbon group of 1 to 20 carbon atoms or a halogenated hydrocarbon group of 1 to 20 carbon atoms. Y is preferably a divalent hydrocarbon group of 1 to 5 carbon atoms, a divalent silicon-containing group or a divalent germanium-containing group, more preferably a divalent silicon-containing group, particularly preferably alkylsilylene, alkylarylsilylene or arylsilylene.

EXAMPLE 8 OF METALLOCENE COMPOUND

As the metallocene compound, a metallocene compound represented by the following formula (10) is also employable.

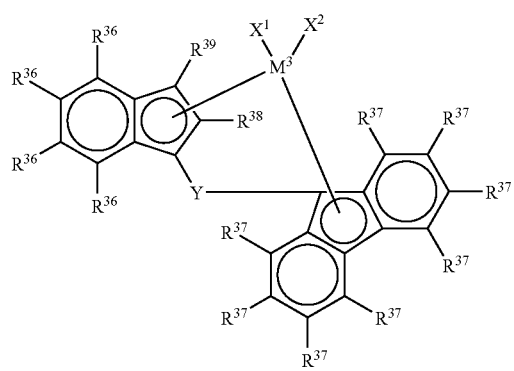

(10)

In the formula (10), M$^3$ is a transition metal atom of Group 4 of the periodic table, specifically titanium, zirconium or hafnium, preferably zirconium. Each R$^{36}$ may be the same or different and is a hydrogen atom, a halogen atom, an alkyl group of 1 to 10 carbon atoms, an aryl group of 6 to 10 carbon atoms, an alkenyl group of 2 to 10 carbon atoms, a silicon-containing group, an oxygen-containing group, a sulfur-containing group, a nitrogen-containing group or a phosphorus-containing group. The alkyl group and the alkenyl group may be substituted with a halogen atom. R$^{36}$ is preferably an alkyl group, an aryl group or a hydrogen atom, particularly preferably a hydrocarbon group of 1 to 3 carbon atoms, i.e., methyl, ethyl, n-propyl or i-propyl, an aryl group, such as phenyl, α-naphthyl or β-naphthyl, or a hydrogen atom. Each R$^{37}$ may be the same or different and is a hydrogen atom, a halogen atom, an alkyl group of 1 to 10 carbon atoms, an aryl group of 6 to 20 carbon atoms, an alkenyl group of 2 to 10 carbon atoms, an arylalkyl group of 7 to 40 carbon atoms, an arylalkenyl group of 8 to 40 carbon atoms, an alkylaryl group of 7 to 40 carbon atoms, a silicon-containing group, an oxygen-containing group, a sulfur-containing group, a nitrogen-containing group or a phosphorus-containing group. The alkyl group, the aryl group, the alkenyl group, the arylalkyl group, the arylalkenyl group and the alkylaryl group may be substituted with halogen. R$^{37}$ is preferably a hydrogen atom or an alkyl group, particularly preferably a hydrogen atom or a hydrocarbon group of 1 to 4 carbon atoms, i.e., methyl, ethyl, n-propyl, i-propyl, n-butyl or tert-butyl. R$^{36}$ and R$^{37}$ may be the same as or different from each other. One of R$^{38}$ and R$^{39}$ is an alkyl group of 1 to 5 carbon atoms, and the other is a hydrogen atom, a halogen atom, an alkyl group of 1 to 10 carbon atoms, an alkenyl group of 2 to 10 carbon atoms, a silicon-containing group, an oxygen-containing group, a sulfur-containing group, a nitrogen-containing group or a phosphorus-containing group. It is preferable that one of R$^{38}$ and R$^{39}$ is an alkyl group of 1 to 3 carbon atoms, such as methyl, ethyl or propyl, and the other is a hydrogen atom. X$^1$ and X$^2$ may be the same as or different from each other and are each a hydrogen atom, a halogen atom, a hydrocarbon group of 1 to 20 carbon atoms, a halogenated hydrocarbon group of 1 to 20 carbon atoms, an oxygen-containing group, a sulfur-containing group or a nitrogen-containing group, or X$^1$ and X$^2$ form a conjugated diene residue. X$^1$ and X$^2$ are each preferably a halogen atom or a hydrocarbon group of 1 to 20 carbon atoms. Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{40}$—, —P(R$^{40}$)—, —P(O)(R$^{40}$)—, —BR$^{40}$— or —AlR$^{40}$— (R$^{40}$ is a hydrogen atom, a halogen atom, a hydrocarbon group of 1 to 20 carbon atoms or a halogenated hydrocarbon group of 1 to 20 carbon atoms). Y is preferably a divalent hydrocarbon group of 1 to 5 carbon atoms, a divalent silicon-containing group or a divalent germanium-containing group, more preferably a divalent silicon-containing group, particularly preferably alkylsilylene, alkylarylsilylene or arylsilylene.

EXAMPLE 9 OF METALLOCENE COMPOUND

As the metallocene compound, a metallocene compound represented by the following formula (11) is also employable.

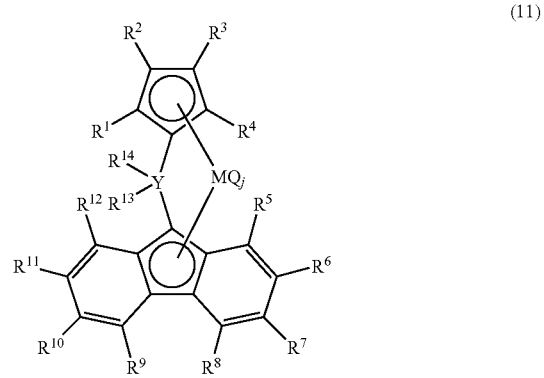

(11)

In the formula (11), Y is selected from carbon, silicon, germanium and tin atoms, M is Ti, Zr or Hf, R$^1$, R$^2$, R$^3$, R$^4$, R$^5$, R$^6$, R$^7$, R$^8$, R$^9$, R$^{10}$, R$^{11}$ and R$^{12}$ may be the same as or different from each other, and selected from hydrogen, a hydrocarbon group, and a silicon containing group, the adjacent substituents of R$^5$ to R$^{12}$ may be bonded to each other to form a ring, R$^{13}$ and R$^1$ may be the same as or different from each other, and selected from a hydrocarbon group, and a silicon containing group, and R$^{13}$ and R$^{14}$ may be bonded to each other to form a ring. Q may be selected in the same or different combination from halogen, a hydrocarbon group, an anionic ligand, and a neutral ligand which can be coordinated to a lone pair of electrons, and j is an integer of 1 to 4. Hereinbelow, the cyclopentadienyl group, the fluorenyl group, and the bridged part which are the characteristics in the chemical structure of the metallocene compound used in the present invention, and other characteristics are sequentially explained, and then preferred metallocene compounds having both these characteristics are also explained.

Cyclopentadienyl Group

The cyclopentadienyl group may be substituted or unsubstituted. The phrase "substituted or unsubstituted cyclopentadienyl group" means a cyclopentadienyl group in which $R^1$, $R^2$, $R^3$, and $R^4$ of the cyclopentadienyl skeleton in the formula (11) are all hydrogen atoms, or at least one of $R^1$, $R^2$, $R^3$, and $R^4$ is a hydrocarbon group (f1), preferably a hydrocarbon group (f1') having a total of 1 to 20 carbon atoms, or a silicon-containing group (f2), preferably a silicon-containing group (f2') having a total of 1 to 20 carbon atoms. If at least two of $R^1$, $R^2$, $R^3$, and $R^4$ are substituted, the substituents may be the same as or different from each other. Further, the phrase "hydrocarbon group having a total of 1 to 20 carbon atoms" means an alkyl group, an alkenyl group, an alkynyl group, or an aryl group, which is composed of only carbon and hydrogen. It includes one in which both of any two adjacent hydrogen atoms are substituted to form an alicyclic or aromatic ring. Examples of the hydrocarbon group (f1') having a total of 1 to 20 carbon atoms includes, in addition to an alkyl group, an alkenyl group, an alkynyl group, or an aryl group, which is composed of only carbon and hydrogen, a heteroatom-containing hydrocarbon group which is a hydrocarbon group in which a part of the hydrogen atoms directly bonded to carbon atoms are substituted with a halogen atom, an oxygen-containing group, a nitrogen-containing group, or a silicon-containing group, and an alicyclic group in which any two hydrogen atoms which are adjacent to each other are substituted. Examples of the hydrocarbon group (f1') include:

a linear hydrocarbon group such as a methyl group, an ethyl group, an n-propyl group, an allyl group, an n-butyl group, an n-pentyl group, an n-hexyl group, an n-heptyl group, an n-octyl group, an n-nonyl group, and an n-decanyl group;

a branched hydrocarbon group such as an isopropyl group, a t-butyl group, an amyl group, a 3-methylpentyl group, a 1,1-diethylpropyl group, a 1,1-dimethylbutyl group, a 1-methyl-1-propyl butyl group, a 1,1-propyl butyl group, a 1,1-dimethyl-2-methylpropyl group, and a 1-methyl-1-isopropyl-2-methylpropyl group;

a cycloalkane group such as a cyclopentyl group, a cyclohexyl group, a cycloheptyl group, a cyclooctyl group, a norbornyl group, and an adamanthyl group;

a cyclic, unsaturated hydrocarbon group and a nuclear alkyl-substituted product thereof such as a phenyl group, a naphthyl group, a biphenyl group, a phenanthryl group, and an anthracenyl group;

a saturated hydrocarbons group substituted with an aryl group such as benzyl group and a cumyl group;

a heteroatom-containing hydrocarbon group such as a methoxy group, an ethoxy group, a phenoxy group, an N-methylamino group, a trifluoromethyl group, a tribromomethyl group, a pentafluoroethyl group, and a pentafluorophenyl group.

The phrase "silicon-containing group (f2)" means a group in which ring carbons of the cyclopentadienyl group are directly covalently bonded, and specific examples thereof include an alkyl silyl group and an aryl silyl group. Examples of the silicon-containing group (f2') having a total of 1 to 20 carbon atoms include a trimethylsilyl group, and a triphenylsilyl group.

Fluorenyl Group

The fluorenyl group may be substituted or unsubstituted. The phrase "substituted or unsubstituted fluorenyl group" means a fluorenyl group in which $R^5$, $R^6$, $R^7$, $R^8$, $R^9$, $R^{10}$, $R^{11}$, and $R^{12}$ of the fluorenyl skeleton in the formula (11) are all hydrogen atoms, or at least one of $R^5$, $R^6$, $R^7$, $R^8$, $R^9$, $R^{10}$, $R^{11}$, and $R^{12}$ is a hydrocarbon group (f1), preferably a hydrocarbon group (f1') having a total of 1 to 20 carbon atoms, or a silicon-containing group (f2), preferably a silicon-containing group (f2') having a total of 1 to 20 carbon atoms. If at least two of $R^5$, $R^6$, $R^7$, $R^8$, $R^9$, $R^{10}$, $R^{11}$, and $R^{12}$ are substituted, the substituents may be the same as or different from each other. $R^5$, $R^6$, $R^7$, $R^8$, $R^9$, $R^{10}$, $R^{11}$, and $R^{12}$ may be bonded to each other to form a ring. From a viewpoint of easy preparation of a catalyst, $R^6$ and $R^{11}$, and $R^7$ and $R^{10}$ are preferably the same to each other.

A preferable example of the hydrocarbon group (f1) is a hydrocarbon group (f1') having a total of 1 to 20 carbon atoms, and a preferable example of the silicon-containing group (f2) is a silicon-containing group (f2') having a total of 1 to 20 carbon atoms.

Covalent Bond Bridging

The main chain of the bond which binds the cyclopentadienyl group with the fluorenyl group is a divalent covalent bond bridging containing a carbon atom, a silicon atom, a germanium atom and a tin atom. An important point when carrying out a high temperature solution polymerization is that a bridging atom Y of the covalent bond bridging part has $R^{13}$ and $R^{14}$ which may be the same as or different from each other. A preferable example of the hydrocarbon group (f1) is a hydrocarbon group (f1') having a total of 1 to 20 carbon atoms, and a preferable example of the silicon-containing group (f2) is a silicon-containing group (f2') having a total of 1 to 20 carbon atoms.

Other Characteristics of Bridged Metallocene Compound

As for other characteristics of the bridged metallocene compound, in the above-described formula (11), Q is selected in the same or different combination from halogen, a hydrocarbon group having 1 to 10 carbon atoms, a neutral, conjugated or non-conjugated diene having 10 carbon atoms or less, an anionic ligand, and a neutral ligand which can be coordinated to a lone pair of electrons. Specific examples of halogen include fluorine, chlorine, bromine, and iodine, and specific examples of the hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, and cyclohexyl, 1-methyl-1-cyclohexyl. Specific examples of the neutral, conjugated or non-conjugated diene having 10 carbon atoms or less include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene. Specific examples of the anionic ligand include an alkoxy group such as methoxy, tert-butoxy, and phenoxy, a carboxylate group such as acetate, and benzoate, and a sulfonate group such as mesylate, and tosylate. Specific examples of the neutral ligand which can be coordinated to a lone pair of electrons include organophosphorus compounds such as trimethylphosphine, triethylphosphine, triphenylphosphine, and diphenylmethyl phosphine, or ethers such as tetrahydrofuran, diethyl ether, dioxane, and 1,2-dimethoxyethane. j is an integer of 1 to 4, and when j is no less than 2, Q's may be the same as or different from each other.

EXAMPLE 10 OF METALLOCENE COMPOUND

As the metallocene compound, a metallocene compound represented by the following formula (12) is also employable.

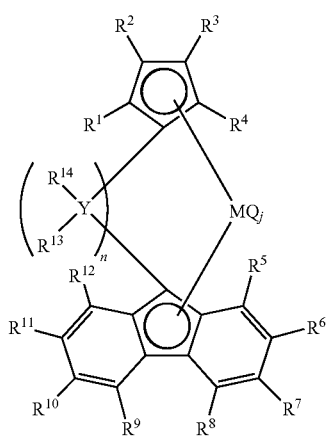

(12)

In the above formula, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ may be the same as or different from each other, and selected from hydrogen, a hydrocarbon group, and a silicon containing group, the adjacent substituents of $R^1$ to $R^{14}$ may be bonded to each other to form a ring, M is Ti, Zr or Hf, Y is an atom of Group 14 of the periodic table, Q is selected in the same or different combination from halogen, a hydrocarbon group, a neutral, conjugated or non-conjugated diene having 10 carbon atoms or less, an anionic ligand, and a neutral ligand which can be coordinated to a lone pair of electrons, n is an integer of 2 to 4, and j is an integer of 1 to 4.

In the formula (12), the hydrocarbon group is preferably an alkyl group having 1 to 20 carbon atoms, an aryl group having 7 to 20 carbon atoms, an aryl group having 6 to 20 carbon atoms, or an alkylaryl group having 7 to 20 carbon atoms, and may contain at least one ring structure.

Specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethyl butyl, neopentyl, cyclohexylmethyl, cyclohexyl, 1-methyl-1-cyclohexyl, 1-adamanthyl, 2-adamanthyl, 2-methyl-2-adamanthyl, menthyl, norbornyl, benzyl, 2-phenylethyl, 1-tetrahydro naphthyl, 1-methyl-1-tetrahydro naphthyl, phenyl, naphthyl, and tolyl.

In the formula (12), the silicon-containing group is preferably an alkyl or arylsilyl group having 1 to 4 silicon atoms and 3 to 20 carbon atoms, and specific examples thereof include trimethylsilyl, tert-butyldimethylsilyl, and triphenylsilyl.

In the present invention, $R^1$ to $R^{14}$ in the formula (12) are selected from hydrogen, a hydrocarbon group, and a silicon-containing hydrocarbon group, and may be the same as or different from each other. Preferable examples of the hydrocarbon group and the silicon-containing group are as described above.

The adjacent substituents of $R^1$ to $R^{14}$ in the cyclopentadienyl ring in the formula (12) may be bonded to each other to form a ring.

M of the formula (12) is an element of Group 4 of the periodic table, that is, zirconium, titanium or hafnium, preferably zirconium.

Y is an atom of Group 14 of the periodic table, preferably a carbon atom or a silicon atom. n is an integer of 2 to 4, preferably 2 to 3, and particularly preferably 2.

Q is selected in the same or different combination from halogen, a hydrocarbon group, a neutral, conjugated or non-conjugated diene having 10 carbon atoms or less, an anionic ligand, and a neutral ligand which can be coordinated to a lone pair of electrons. If Q is a hydrocarbon group, it is more preferably a hydrocarbon group having 1 to 10 carbon atoms.

Specific examples of halogen include fluorine, chlorine, bromine, and iodine, and specific examples of the hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, and cyclohexyl, 1-methyl-1-cyclohexyl. Specific examples of the neutral, conjugated or non-conjugated diene having 10 carbon atoms or less include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene. Specific examples of the anionic ligand include an alkoxy group such as methoxy, tert-butoxy, and phenoxy, a carboxylate group such as acetate, and benzoate, and a sulfonate group such as mesylate, and tosylate. Specific examples of the neutral ligand which can be coordinated to a lone pair of electrons include organophosphorus compounds such as trimethylphosphine, triethylphosphine, triphenylphosphine, and diphenylmethyl phosphine, or ethers such as tetrahydrofuran, diethyl ether, dioxane, and 1,2-dimethoxyethane. When j is no less than 2, Q's may be the same as or different from each other.

In the formula (12), 2 to 4 Y's are present, and Y's may be the same as or different from each other. A plurality of $R^{13}$'s and a plurality of $R^{14}$'s may be the same as or different from each other. For example, a plurality of $R^{13}$'s which are bonded to the same Y may be different from each other, and a plurality of $R^{13}$'s which are bonded to the different Y's may be the same to each other. Otherwise, $R^{13}$'s and $R^{14}$'s may be taken to form a ring.

Preferable examples of the compound represented by the formula (12) include a transition metal compound represented by the following formula (13).

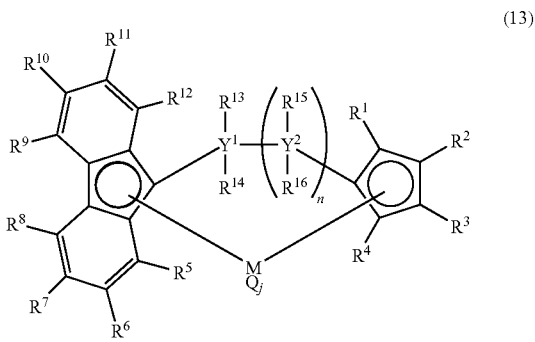

(13)

In the formula (13), $R^1$, $R^2$, $R^3$, $R^4$, $R^5$, $R^6$, $R^7$, $R^8$, $R^9$, $R^{10}$, $R^{11}$, and $R^{12}$ may be the same as or different from each other, and selected from hydrogen, a hydrocarbon group, and a silicon containing group, $R^{13}$, $R^{14}$, $R^{15}$, and $R^{16}$ are hydrogen, or a hydrocarbon group, and n is an integer of 1 to 3. With n=1, $R^1$ to $R^{16}$ are not hydrogen at the same time, and each may be the same as or different from each other. The adjacent substituents of $R^5$ to $R^{12}$ may be bonded to each other to form a ring, $R^{13}$ and $R^{15}$ may be bonded to each other to form a ring, and $R^{13}$ and $R^{15}$, and $R^{14}$ and $R^{16}$ may be bonded to each other to form a ring at the same time, $Y^1$ and $Y^2$ are atoms of Group 14 of the periodic table, M is Ti, Zr or Hf. Q is selected in the same or different combination from halogen, a hydrocarbon group, an anionic ligand, and a neutral ligand which can be coordinated to a lone pair of electrons, and j is an integer of 1 to 4.

The compounds such as those as described in (Example 9 of Metallocene Compound) and (Example 10 of Metallocene Compound) are mentioned in JP-A No. 2004-175707, WO2001/027124, WO2004/029062, and WO2004/083265.

The metallocene compounds described above are used singly or in combination of two or more kinds. The metallocene compounds may be used after diluted with hydrocarbon, halogenated hydrocarbon or the like.

The components of the catalyst comprise (A) the bridged metallocene compound, and (B) at least one kind of the compound selected from (b-1) an organoaluminum oxy-compound, (b-2) a compound which reacts with the bridged metallocene compound (A) to form ion pairs, and (b-3) an organoaluminum compound.

Hereinbelow, the component (B) will be described in detail.

<(b-1) Organoaluminum Oxy-Compound>

According to the present invention, as the organoaluminum oxy-compound (b-1), publicly known aluminoxane can be used as it is. Specifically, such publicly known aluminoxane is represented by the following formula (14) or (15).

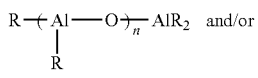 (14)

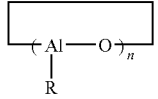 (15)

wherein R represents a hydrocarbon group having 1 to 10 carbon atoms, and n represents an integer of 2 or more. Among these compounds, for the methyl aluminoxane in which R is a methyl group and n is 3 or more, preferably 10 or more are preferably used. These aluminoxanes may be incorporated with some organoaluminum compounds. In addition, when a high temperature solution polymerization is carried out, the benzene-insoluble organoaluminum oxy-compounds as described in JP-A No. Hei 2-78687 can be employed. Further, the organoaluminum oxy-compounds as described in JP-A No. Hei 2-167305, and the aluminoxanes having at least two kinds of alkyl groups as described in JP-A Nos. Hei 2-24701, and Hei 3-103407 are preferably used. In addition, the phrase "benzene insoluble" regarding the organoaluminum oxy-compounds used in high temperature solution polymerization, the proportion of the Al components dissolved in benzene at 60° C. in terms of an Al atom is usually 10% or less, preferably 5% or less, and particularly preferably 2% or less, and that is, the compound has insolubility or poor solubility in benzene.

Examples of the organoaluminum oxy-compound used in the present invention include a modified methyl aluminoxane having the structure of the following structure (16).

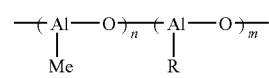 (16)

(wherein R represents a hydrocarbon group having 1 to 10 carbon atoms, and m and n represent integers of 2 or more). This modified methyl aluminoxane is prepared from trimethyl aluminum and alkyl aluminum other than trimethyl aluminum. This modified methyl aluminoxane is generally referred to as MMAO. Such MMAO can prepared by the method as described in U.S. Pat. Nos. 4,960,878 and 5,041,584.

Further, the modified methyl aluminoxane in which R is an iso-butyl group, prepared from trimethyl aluminum and tri-isobutyl aluminum from Tosoh Finechem Corp., is commercially produced in a trade name of MMAO or TMAO. The MMAO is aluminoxane with improved solubility in various solvents, and storage stability, and specifically, it is dissolved in an aliphatic or alicyclic hydrocarbon, although the aluminoxane described for the formula (14) or (15) has insolubility or poor solubility in benzene.

Further, examples of the organoaluminum oxy-compound (b-1) used in the present invention include a boron-containing organoaluminum oxy-compound represented by the following formula (17).

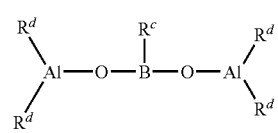 (17)

(wherein $R^c$ represents a hydrocarbon group having 1 to 10 carbon atoms, $R^d$'s may be the same as or different from each other, and represent a hydrogen atom, a halogen atom or a hydrocarbon group having 1 to 10 carbon atoms).

<(b-2) Compounds which React with the Bridged Metallocene Compound (A) to Form an Ion Pair>

Examples of the compound (b-2) which reacts with the bridged metallocene compound (A) to form an ion pair (referred to as an "ionic compound" hereinafter) may include Lewis acids, ionic compounds, borane compounds and carborane compounds, as described in each publication of JP-A Nos. Hei 1-501950, Hei 1-502036, Hei 3-179005, Hei 3-179006, Hei 3-207703 and Hei 3-207704, and U.S. Pat. No. 5,321,106. They also include a heteropoly compound and an iso-poly compound.

According to the present invention, the ionic compound which is preferably employed is a compound represented by the following formula (18).

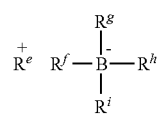 (18)

wherein examples of $R^{e+}$ include $H^+$, a carbenium cation, an oxonium cation, an ammonium cation, a phosphonium cation, a cycloheptyltrienyl cation, and a ferrocenium cation having transition metal. $R^f$ to $R^i$ may be the same as or different from each other, and each represent an organic group, preferably an aryl group.

Specific examples of the carbenium cation include 3-substituted carbenium cations such as a triphenyl carbenium cation, a tris(methylphenyl) carbenium cation, and a tris(dimethylphenyl) carbenium cation.

Specific examples of the ammonium cation include a trialkyl ammonium cation such as a trimethyl ammonium cation, a triethyl ammonium cation, a tri(n-propyl)ammonium cation, a tri-isopropyl ammonium cation, a tri(n-butyl)ammonium cation, and a tri-isobutyl ammonium cation, a N,N-dialkyl anilinium cation such as an N,N-dimethyl anilinium cation, an N,N-diethyl anilinium cation, and an N,N-2,4,6-pentamethyl anilinium cation, and a dialkyl ammonium cation such as a diisopropyl ammonium cation and a dicyclohexyl ammonium cation.

Specific examples of the phosphonium cation include a triaryl phosphonium cation such as a triphenylphosphonium cation, tris(methylphenyl)phosphonium cation, and tris(dimethylphenyl)phosphonium cation.

Among them, $R^{e+}$ is preferably a carbenium cation, an ammonium cation, or the like, and particularly preferably a triphenylcarbenium cation, a N,N-dimethyl anilinium cation, or an N,N-diethyl anilinium cation.

Specific examples of the carbenium salts include triphenyl carbenium tetraphenylborate, triphenyl carbenium tetrakis(pentafluorophenyl)borate, triphenyl carbenium tetrakis(3,5-ditrifluoromethylphenyl)borate, tris(4-methylphenyl) carbenium tetrakis(pentafluorophenyl)borate, and tris(3,5-dimethylphenyl) carbenium tetrakis(pentafluorophenyl)borate.

Examples of the ammonium salt include a trialkyl-substituted ammonium salt, an N,N-dialkyl anilinium salt, and a dialkyl ammonium salt.

Examples of the trialkyl-substituted ammonium salt include triethyl ammonium tetraphenyl borate, tripropyl ammonium tetraphenyl borate, tri(n-butyl)ammonium tetraphenyl borate, trimethyl ammonium tetrakis(p-tolyl)borate, trimethyl ammonium tetrakis(o-tolyl)borate, tri(n-butyl)ammonium tetrakis(pentafluorophenyl)borate, triethyl ammonium tetrakis(pentafluorophenyl)borate, tripropyl ammonium tetrakis(pentafluorophenyl)borate, tripropyl ammonium tetrakis(2,4-dimethylphenyl)borate, tri(n-butyl) ammonium tetrakis(3,5-dimethylphenyl)borate, tri(n-butyl) ammonium tetrakis(4-trifluoromethylphenyl)borate, tri(n-butyl)ammonium tetrakis(3,5-ditrifluoromethylphenyl) borate, tri(n-butyl)ammonium tetrakis(o-tolyl)borate, dioctadecyl methyl ammonium tetraphenyl borate, dioctadecyl methyl ammonium tetrakis(p-tolyl)borate, dioctadecyl methyl ammonium tetrakis(o-tolyl)borate, dioctadecyl methyl ammonium tetrakis(pentafluorophenyl)borate, dioctadecyl methyl ammonium tetrakis(2,4-dimethylphenyl)borate, dioctadecyl methyl ammonium tetrakis(3,5-dimethylphenyl)borate, dioctadecyl methyl ammonium tetrakis(4-trifluoromethylphenyl)borate, dioctadecyl methyl ammonium tetrakis(3,5-ditrifluoromethylphenyl)borate, and dioctadecyl methyl ammonium.

Examples of the N,N-dialkyl anilinium salt, include N,N-dimethyl anilinium tetraphenyl borate, N,N-dimethyl anilinium tetrakis(pentafluorophenyl)borate, N,N-dimethyl anilinium tetrakis(3,5-ditrifluoromethylphenyl)borate, N,N-diethyl anilinium tetraphenyl borate, N,N-diethyl anilinium tetrakis(pentafluorophenyl)borate, N,N-diethyl anilinium tetrakis(3,5-ditrifluoromethylphenyl)borate, N,N-2,4,6-pentamethyl anilinium tetraphenyl borate, and N,N-2,4,6-pentamethyl anilinium tetrakis(pentafluorophenyl)borate.

Examples of the dialkyl ammonium salt include di(1-propyl)ammonium tetrakis(pentafluorophenyl)borate, and dicyclohexyl ammonium tetraphenyl borate.

The ionic compounds as disclosed in JP-A No. 2004-51676 by the present Applicant can be used without any restriction.

The ionic compounds (b-2) can be used in a mixture of two or more kinds.

<(b-3) Organoaluminum Compound>

Examples of the organoaluminum compound (b-3) which constitutes the catalyst for olefin polymerization include an organoaluminum compound represented by the following formula (X), and an alkylated complex with a metal element from Group 1 of the periodic table and aluminum, which is represented by the following formula (19):

$$R^a{}_m Al(OR^b)_n H_p X_q \qquad (19)$$

(wherein $R^a$ and $R^b$ are may be the same as or different from each other and each represent a hydrocarbon group having usually 1 to 15 carbon atoms, preferably 1 to 4 carbon atoms, X is a halogen atom, and m, n, p, and q are numbers satisfying the conditions: $0<m\leq 3$, $0\leq n<3$, $0\leq p<3$, and $0\leq q<3$, while $m+n+p+q=3$). Specific examples of the compound represented by the formula (19) include tri-n-alkyl aluminum such as trimethyl aluminum, triethyl aluminum, tri-n-butyl aluminum, trihexyl aluminum, and trioctyl aluminum; tri-branch chained alkyl aluminum such as tri-isopropyl aluminum, tri-isobutyl aluminum, tri-sec-butyl aluminum, tri-tert-butyl aluminum, tri-2-methylbutyl aluminum, tri-3-methyl hexyl aluminum, and tri-2-ethylhexyl aluminum; tri-cycloalkyl aluminum such as tri-cyclohexyl aluminum, and tri-cyclooctyl aluminum; triaryl aluminum such as triphenyl aluminum, and tritolyl aluminum; dialkyl aluminum hydride such as diisopropyl aluminum hydride, and diisobutyl aluminum hydride; alkenyl aluminum, such as isoprenyl aluminum, represented by the formula: $(i\text{-}C_4H_9)_x Al_y (C_5H_{10})_z$ (wherein x, y and z are positive integers, and z is the numbers satisfying the conditions: $z \leq 2x$); alkyl aluminum alkoxide such as isobutyl aluminum methoxide, and isobutyl aluminum ethoxide; dialkyl aluminum alkoxide such as dimethyl aluminum methoxide, diethyl aluminum ethoxide, and dibutyl aluminum butoxide; alkyl aluminum sesquialkoxide such as ethyl aluminum sesquiethoxide, and butyl aluminum sesquibutoxide; partially alkoxylated alkyl aluminum, for example, having a mean compositions represented by the general formula $R^a{}_{2.5} Al (OR^b)_{0.5}$; alkyl aluminum aryloxy such as diethyl aluminum phenoxide, diethyl aluminum (2,6-di-t-butyl-4-methylphenoxide); dialkyl aluminum halide such as dimethyl aluminum chloride, diethyl aluminum chloride, dibutyl aluminum chloride, diethyl aluminum bromide, and diisobutyl aluminum chloride; alkyl aluminum sesquihalide such as ethyl aluminum sesquichloride, butyl aluminum sesquichloride, and ethyl aluminum sesquibromide; partially halogenated alkyl aluminum of alkyl aluminum dihalide such as ethyl aluminum dichloride; dialkyl aluminum hydride such as diethyl aluminum hydride, and dibutyl aluminum hydride; other partially hydrogenated alkyl aluminum, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Examples of an alkylated complex with a metal element from Group 1 of the periodic table and aluminum, represented by the following formula (20):

$$M^2AlR^a{}_4 \qquad (20)$$

(wherein $M^2$ is Li, Na or K, and $R^a$ is a hydrocarbon group having usually 1 to 15 carbon atoms, preferably 1 to 4 carbon atoms) include $LiAl(C_2H_5)_4$ and $LiAl(C_7H_{15})_4$.

The compounds similar to the compounds represented by the formula (20), for example, the organoaluminum compounds in which two or more aluminum compounds are bonded via a nitrogen atom, can be used. Specific examples thereof include $(C_2H_5)_2AlN(C_2H_5)Al(C_2H_5)_2$.

From a viewpoint of easy availability, as an organoaluminum compound (b-3), trimethyl aluminum or tri-isobutyl aluminum is preferably used.

<Polymerization>

The polyethylene wax used in the invention is obtained by homopolymerizing ethylene usually in a liquid phase, or copolymerizing ethylene and an α-olefin usually in a liquid phase, in the presence of the above-mentioned metallocene catalyst. In the polymerization, the method for using each of the components, and the sequence of addition are optionally selected, but the following methods may be mentioned.

[q1] A method for adding a component (A) alone to a polymerization reactor.

[q2] A method for adding a component (A) and a component (B) to a polymerization reactor in any order.

For the [q2] method, at least two of each catalyst components may be in contact with each other beforehand. At this time, a hydrocarbon solvent is generally used, but an α-olefin may be used as a solvent. In addition, the monomers used herein are as previously described.

As the polymerization process, suspension polymerization wherein polymerization is carried out in such a state that the polyethylene wax is present as particles in a solvent such as hexane, or gas phase polymerization wherein a solvent is not used, or solution polymerization wherein polymerization is carried out at a polymerization temperature of not lower than 140° C. in such a state that the polyethylene wax is molten in the presence of a solvent or is molten alone is employable. Among these, solution polymerization is preferable in both aspects of economy and quality.

The polymerization reaction may be carried out as any of a batch process and a continuous process. When the polymerization is carried out as a batch process, the afore-mentioned catalyst components are used in the concentrations described below.

The component (A) in the polymerization of an olefin using the above-described catalyst for polymerization of an olefin is used in the amount in the range of usually $10^{-9}$ to $10^{-1}$ mol/liter, preferably $10^{-8}$ to $10^{-2}$ mol/liter.

The component (b-1) is used in the amount in the range of usually 0.01 to 5,000, preferably 0.05 to 2,000, as a mole ratio of all transition metal atoms (M) in the component (b-1) to the component (A) [(b-1)/M]. The component (b-2) is used in the amount in the range of usually 0.01 to 5,000, preferably 1 to 2,000, as a mole ratio of the ionic compounds in the components (b-2) to all transition metals (M) in the component of (A) [(b-2)/M]. The component (b-3) is used in the amount in the range of usually 1 to 10000, preferably 1 to 5000, as a mole ratio of the component (b-3) to the transition metal atoms (M) in the component (A) [(b-3)/M].

The polymerization reaction is carried out under the conditions of a temperature of usually −20 to +200° C., preferably 50 to 180° C., more preferably 70 to 180° C., and a pressure of more than 0 and not more than 7.8 MPa (80 kgf/cm², gauge pressure), preferably more than 0 and not more than 4.9 MPa (50 kgf/cm², gauge pressure).

In the polymerization, ethylene and, if desired, an α-olefin are fed to the polymerization system so as to obtain a polyolefin wax having a specific composition as described above. In the polymerization, a molecular weight modifier such as hydrogen can be also added.

When polymerization is carried out in this manner, a polymer produced is usually obtained as a polymerization solution containing the polymer. Therefore, by treating the polymerization solution in the usual way, a polyethylene wax is obtained.

As the metallocene catalyst, a catalyst containing the metallocene compound described in "Example 6 of metallocene compound" is preferable.

Using these catalysts, a polyolefin wax having the above ranges of Mn, Mw/Mn, a melting point and other preferable physical properties can be obtained. The polyolefin wax obtained with the catalysts has high effect for improving the fluidity, greatly improves the molding rate, and reduces the content of the tacky components, and thus a molded product with no surface tackiness can be obtained.

<Thermoplastic Resin (B)>

In the present invention, a thermoplastic resin (B) is mixed with the polyolefin wax (A) for use. The thermoplastic resin (B) according to the present invention refers to a thermoplastic polymer, or a blend thereof, having a number-average molecular weight (Mn) in terms of polystyrene, as measured by gel permeation chromatography (GPC), of 8,000 or more, of preferably more than 10,000.

The thermoplastic resin (B) used in the present invention is not particularly limited, but examples thereof include polyolefins such as a low-density polyethylene, a medium-density polyethylene, a high-density polyethylene, a straight-chained low-density polyethylene, polypropylene, a cyclic olefin polymer, an ethylene-propylene copolymer, and a cyclic olefin copolymer;

styrene polymers such as polystyrene, an acrylonitrile-styrene copolymer, and an acrylonitrile-butadiene-styrene copolymer;

polyvinyl chloride, polyvinylidene chloride;

an ethylene-methacrylic acid copolymer, an ethylene-methacrylic acid ester copolymer, an ethylene-vinyl acetate copolymer, an ethylene-vinyl alcohol copolymer;

polycarbonate, polymethacrylate;

polyesters such as polyethylene terephthalate, and polybutylene terephthalate;

polyamides such as Nylon 6, Nylon 11, Nylon 12, Nylon 46, Nylon 66, Nylon MXD6, wholly-aromatic polyamide, and semi-aromatic polyamide;

polyacetal, and a blend of these resins.

Among these thermoplastic resins, polyolefin is preferable; and a low-density polyethylene, a medium-density polyethylene, a high-density polyethylene, a straight chained low-density polyethylene, polypropylene, and an ethylene-propylene copolymer are more preferable.

If the thermoplastic resin (B) is the above-described resin, the dispersity with the polyolefin wax (A) is excellent essentially, and the thermoplastic resin composition comprising the thermoplastic resin (B) has the increased effect of improvement on the fluidity and tends to have a further increased molding speed. From the resin composition, for example, a molded product having no surface tackiness is obtained. Further, good dispersion of the polyolefin wax in the molded product can give suppression of the reduction of the performances of the molded product such as lowered strength of the molded product and bleed-out of the low molecular weight components compared to the molded product adding the conventional wax.

The thermoplastic resin (B) is preferably a particle in the form of a pellet or a tablet.

<Additive>

In the present invention, in addition to the polyolefin wax (A) and the thermoplastic resin (B), additives including stabilizers such as an antioxidant, an ultraviolet absorber and a light stabilizer, a metallic soap, a filler, and a flame retardant can be further added, if desired, to the mixture in the preparation of the thermoplastic resin composition.

Examples of the stabilizer include an antioxidant such as hindered phenol compounds, phosphite compounds, and thioether compounds;

a UV absorber such as benzotriazole compounds, and benzophenone compound; and a light stabilizer such as hindered amine compounds.

Examples of the metallic soap include stearates such as magnesium stearate, calcium stearate, barium stearate, and zinc stearate.

Examples of the filler include calcium carbonate, titanium oxide, barium sulfate, talc, clay and carbon black.

Examples of the flame retardant include halogenated compounds which include halogenated diphenyl ether such as decabromodiphenyl ether, and octabromodiphenyl ether, and halogenated polycarbonate; inorganic compounds such as antimony trioxide, antimony tetraoxide, antimony pentoxide, sodium pyroantimonate, and aluminum hydroxide; and phosphorus compounds.

Further, as the flame retarding aid for drip prevention, a compound such as tetrafluoroethylene can be added.

Examples of the antibacterial agent or the antifungal agent include organic compounds such as an imidazole compound, thiazole compound, a nitrile compound, a haloalkyl compound, and a pyridine compound;

inorganics and inorganic compounds such as silver, a silver compound, a zinc compound, a copper compound, and a titanium compound.

Among these compounds, silver and the silver compound are desirable due to its high thermal stability.

Examples of the silver compounds include silver complexes, silver salts such as fatty acid salts and phosphoric acid salts and the like.

If silver and the silver compounds are used as an antibacterial agent or an antifungal agent, these may be used as supported on a porous structure such as zeolite, silica gel, zirconium phosphate, calcium phosphate, hydrotalcite, hydroxyapatite, calcium silicate.

Other additives also include a colorant, a plasticizer, an anti-aging agent, a pigment, and oils.

Process for Producing Thermoplastic Resin Composition

In the process for producing the thermoplastic resin composition of the present invention, firstly a mixture comprising the polyolefin wax (A), the thermoplastic resin (B), and if desired, an additive is prepared. The process for preparing the mixture is not particularly limited, but the mixture may be produced by simply putting the compounding materials into a container and shaking them for mixing, or by using a mixing device such as a tumbler and a Henschel mixer.

By melt-kneading thus prepared mixture, the thermoplastic resin composition of the present invention can be obtained. The melt-kneading can be carried out using, for example, an extruder, a plastomill, a Brabender, a kneader, a roll mixer, a Banbury mixer, or the like.

The temperature for melt-kneading is not particularly limited as long as the polyolefin wax (A), the thermoplastic resin (B), and the like are molten, but if the thermoplastic resin is polypropylene, it is usually in the range of usually 190 to 300° C., preferably 200 to 250° C.

The amount of the polyolefin wax (A) blended in the thermoplastic resin composition is not particularly limited, but it is usually 0.01 to 20 parts by weight, preferably 0.1 to 10 parts by weight, and more preferably 0.3 to 5 parts by weight based on 100 parts by weight of the thermoplastic resin (B).

With blending the polyolefin wax (A) in the above range, there is a tendency that the improvement on the fluidity upon molding of the thermoplastic resin composition is increased, and the molding speed is further enhanced. As compared with the thermoplastic resin composition including no polyolefin wax (A), the thermoplastic resin composition of the present invention tends to allow molding at a lower molding temperature, to shorten the cooling time, and thus to increase the molding cycle. Further, the molding temperature tends to be lowered, thus leading to suppression of the thermal deterioration of the resin and then reduction of the resin strength, as well as to suppression of the burning and black speck of the resin.

[Molded Product]

The molded product of the present invention can be obtained by molding the above thermoplastic resin composition. Examples of the molding process include injection molding, extrusion molding, blow molding, and other known molding processes.

For example, if the molded product of the present invention is obtained by extrusion blow molding, a molded product is obtained usually by melting the mixture of a polyolefin wax (A) and a thermoplastic resin (B); extruding the mixture to a tubular parison from a die at a resin temperature in the range of usually 170 to 240° C.; holding the parison in the mold having a desired shape; blowing air; and contacting the parison with the mold usually at a resin temperature in the range of 160 to 230° C. Further, drawing can be effected at a suitable ratio upon extrusion blow molding.

If extrusion blow molding is effected using a high-density polyethylene as the thermoplastic resin (A), a molded product is obtained by extruding the resin from a die at a resin temperature in the range of usually 170 to 220° C., preferably 180 to 210° C., and contacting the resin with the mold at a resin temperature in the range of usually 160 to 210° C., preferably 170 to 200° C. Further, drawing can be effected extrusion upon extrusion blow molding.

If extrusion blow molding is effected using polypropylene as the thermoplastic resin (A), a molded product is obtained by extruding the resin from a die at a resin temperature in the range of usually 190 to 230° C., preferably 200 to 220° C., and contacting the resin with the mold at a resin temperature in the range of usually 180 to 220, preferably 190 to 210° C. Further, drawing can be effected upon extrusion blow molding.

Each of these blow molding processes can be carried out using a appropriate molding machine corresponding to each blow molding process.

If injection molding is effected using polypropylene as the thermoplastic resin (A), the cylinder temperature upon injection molding is in the range of usually 180 to 400° C., preferably 200 to 300° C., and preferably 200 to 250° C., and the injection pressure in the range of usually 10 to 200 MPa, preferably 20 to 150 MPa, and the mold temperature is in the range of usually 20 to 200° C., preferably 20 to 80° C., and more preferably 20 to 60° C.

If molding is effected to give an extruded sheet or a film using polypropylene as the thermoplastic resin (A) by means of a T-die extruder, or the like, the extrusion molding can be effect at a temperature in the range of usually 200 to 300° C., preferably 200 to 270° C., and more preferably 200 to 250° C. to obtain a molded product. Further, a film extruded from the extruder may be drawn, for example, by a tenter process (horizontal/vertical drawing, or vertical/horizontal drawing), a co-biaxial drawing process, or a monoaxial drawing process to obtain a drawn film.

Further, upon molding, an expanding agent can added to the thermoplastic resin composition to perform expansion extrusion molding. In the case of expansion extrusion, the design of a die and a sizing die should be made in consideration of the expansion ratio, or the like. As the expanding agent for preparing the expansion molded product according to the present invention, organic or inorganic chemical expanding agents are preferable. Examples of the chemical expanding agents generally include azodicarbonamide (ADCA), azobisisobutyronitrile (AIBN), N,N'-dinitrosopentamethylenetetramine (DPT), 4,4'-oxybis(benzenesulfonylhydrazide) (OBSH), sodium hydrogen carbonate (baking soda), ammonium carbonate, and the like. These expanding agents may be used in a mixture of two or more kinds. Further, an expanding aid such as a zinc compound, an urea compound, an acidic substance, amines, and the like can be used. In addition, a masterbatch having an expanding agent with improved handleability may be used.

Since the mixture obtained by adding the polyolefin wax to the thermoplastic resin (B) is melted and molded, the melting viscosity of the resin is lowered. Thus, a load upon molding, for example, a load on the motor upon extrusion molding is lowered, and the fluidity is improved, and thus there is a tendency that the molding speed is increased. Further, a molded product having a smooth surface by the improvement of the surface of the molded product can be obtained. In addition, the molding can be effected at a lower molding temperature, so as to shorten the cooling time, and thus to increase the molding cycle, as well as to suppression of the thermal deterioration of the resin and the burning and black speck of the resin, and the molded product has excellent mechanical strength.

EXAMPLES

The present invention is further described with reference to the following examples, but it should be construed that the invention is in no way limited to those examples.

[Raw Materials]

Thermoplastic resin: Polypropylene (Prime Polypropylene F113G, manufactured by Prime Polypropylene Co., Ltd.; a mesh-on amount ratio through a mesh having a sieve opening of 2.00 mm$\phi$ of 100% by weight, and a mesh passing amount ratio through a mesh having a sieve opening of 5.66 mm$\phi$ of 100% by weight)

Wax (1): Excerex 30200 BT (manufactured by Mitsui Chemical Inc.) [content of ethylene: 95 mol %, density: 913 kg/m$^3$, average molecular weight (Mn)=2000, particle diameter: a size for passing through a mesh having a sieve opening of 5.66 mm$\phi$ and non-passing through a sieve opening of 2.00 mm+]

Wax (2): Excerex 30200 B (manufactured by Mitsui Chemical Inc.) [content of ethylene: 95 mol %, density: 913 kg/m$^3$, average molecular weight (Mn)=2000, molecular weight distribution (Mw/Mn): 2.5, crystallization temperature (Tc): 86° C., particle diameter: a size for passing through a mesh having a sieve opening of 2.00 mm$\phi$, average particle size: 350 μm]

[Evaluation]

The following properties were evaluated.

[Mixability of Wax]

The mixability of the wax was evaluated by observing the presence of adherence of the wax to the inner wall of the tumbler mixer with eyes.
○: No adherence
Δ: Slight adherence
x: Adherence

[Classification in the Hopper]

The classification in the hopper during extrusion in a 20 mm$\phi$ mono-screw extruder was observed with eyes.
○: No classification
Δ: Slight classification
x: Easy classification

[Molding processability]

A film was prepared using a 20 mm$\phi$ mono-screw extruder equipped with a T-die having a lip width of 240 mm, set at a rotational speed of 70 rpm, with a cylinder temperature and a die temperature set at 210° C., respectively, and was evaluated on the molding processability.
○: Thickness is uniform.
Δ: Thickness non-uniformity is slightly prominent.
x: Thickness non-uniformity is considerably prominent.

Example 1

(1) Preparation of a Pellet of a Wax

A metallocene polyethylene wax (Excerex (Registered Trademark) 30200 B, manufactured by Mitsui Chemical Inc., content of ethylene: 95 mol %, density: 913 kg/m$^3$, average molecular weight (Mn) in terms of polyethylene=2000) which had been prepared using a metallocene catalyst was melted in a tank maintained at 140° C., and was molded to a pellet using a tabletizer with a speed of a cooling steel belt set at a rate of 20 m/min, and a temperature of 20° C. Then, the wax pellet was made into a pellet having a particle diameter of from 2.00 to 5.66 mm through a sieve of 3.5-mesh (sieve opening: 5.66 mm) and 9-mesh (sieve opening: 2.00 mm). The pellet had a non-passing amount ratio through a mesh having a sieve opening of 2.00 mm$\phi$ of 100% by weight, a non-passing amount ratio through a mesh having a sieve opening of 2.83 mm$\phi$ of 85% by weight, and a non-passing amount ratio through a mesh having a sieve opening of 3.35 mm$\phi$ of 70% by weight; and a passing amount ratio through a mesh having a sieve opening of 4.00 mm$\phi$ of 80% by weight, and a passing amount ratio through a mesh having a sieve opening of 4.75 mm$\phi$ of 90% by weight.

(2) Preparation of a Thermoplastic Resin Composition

To 100 parts by weight of polypropylene (Prime Polypro F113G, manufactured by Prime Polymer Co., Ltd.) which is a thermoplastic resin, 0.5 part by weight of the pellet of the metallocene polyethylene wax prepared in the above (1) was added, and then mixed with a tumbler mixer for 10 minutes to prepare a mixture of polypropylene and a polyethylene wax.

Evaluation results of the mixability of the wax and the classification in the hopper during extrusion are shown in Table 1.

(3) Preparation of a Molded Product

Using the mixture of polypropylene and the polyethylene wax, as prepared in the above (2), a film was prepared using a 20 mm$\phi$ mono-screw extruder equipped with a T-die having a lip width of 240 mm, set at a rotational speed of 70 rpm, with a cylinder temperature and a die temperature set at 210° C., respectively, and was evaluated on the molding processability.

Examples 2 and 3

The same procedure was carried out as in Example 1, except that the amount of the pelletized wax to be added was changed to the compositions as shown in Table 1, to prepare a thermoplastic resin composition and then to prepare a molded product. The evaluation results are shown in Table 1.

Comparative Example 1

(1) Preparation of a Thermoplastic Resin Composition (Example of Using a Wax which Had not Been Pelletized or not Been Made Shapes of Tablets)

To 100 parts by weight of polypropylene (Prime Polypro F113G, manufactured by Prime Polymer Co., Ltd.) which is a thermoplastic resin, 0.5 part by weight of a powder of a metallocene polyethylene wax (particle diameter: a size for passing through a sieve opening of 2.00 mmϕ, average particle size: 350 μm) was added, and then mixed with a tumbler mixer for 10 minutes to prepare a mixture of polypropylene and a polyethylene wax.

Evaluation results of the mixability of the wax and the classification in the hopper during extrusion are shown in Table 1.

(2) Preparation of a Molded Product

Using the mixture of polypropylene and the polyethylene wax, as prepared in the above (1), a film was prepared using a 20 mmϕ mono-screw extruder equipped with a T-die having a lip width of 240 mm, set at a rotational speed of 70 rpm, with a cylinder temperature and a die temperature set at 210° C., respectively, and was evaluated on the molding processability.

Comparative Examples 2 and 3

The same procedure was carried out as in Comparative Example 1, except that the amount of the pelletized wax to be added was changed to the compositions as shown in Table 1, to prepare a thermoplastic resin composition and then to prepare a molded product. The evaluation results are shown in Table 1.

TABLE 1

|  | Example 1 | Example 2 | Example 3 | Comp. Ex. 1 | Comp. Ex. 2 | Comp. Ex. 3 |
|---|---|---|---|---|---|---|
| Thermoplastic resin Polypropylene (Parts by weight) | 100 | 100 | 100 | 100 | 100 | 100 |
| Wax (1) (Parts by weight) | 0.5 | 2.0 | 5.0 |  |  |  |
| Wax (2) (Parts by weight) |  |  |  | 0.5 | 2.0 | 5.0 |
| Mixability | ○ | ○ | ○ | Δ | x | x |
| Classification | ○ | ○ | ○ | Δ | x | x |
| Thickness non-uniformity | ○ | ○ | ○ | Δ | x | x |

What is claimed is:

1. A process for producing a thermoplastic resin composition, comprising melt-kneading a mixture of a polyolefin wax (A) in the particle form, which has a passing ratio through a mesh having a sieve opening of 5.66 mmϕ of 95% by weight or more, and a non-passing ratio through a mesh having a sieve opening of 2.00 mmϕ of 95% by weight or more, and a thermoplastic resin (B) wherein the amount of the polyolefin wax (A) is 0.01 to 20 parts by weight based on 100 parts by weight of the thermoplastic resin (B).

2. The process for producing a thermoplastic resin composition according to claim 1, wherein the polyolefin wax (A) is a polyethylene wax.

3. The process for producing a thermoplastic resin composition according to claim 1, wherein the polyolefin wax (A) is a polyethylene wax obtained by a metallocene catalyst.

4. A process for producing a molded product from the thermoplastic resin composition as described in claim 1.

5. A molded product obtained from the thermoplastic resin composition as described in claim 1.

6. The process for producing a thermoplastic resin composition according to claim 1, wherein the amount of the polyolefin wax (A) is 0.1 to 10 parts by weight of the thermoplastic resin (B).

7. The process for producing a thermoplastic resin composition according to claim 1, wherein the amount of the polyolefin wax (A) is 0.3 to 5 parts by weight of the thermoplastic resin (B).

* * * * *